United States Patent [19]

Villemaud

[11] 4,406,230

[45] Sep. 27, 1983

[54] AUTOMATIC CONVEYOR SYSTEM

[76] Inventor: Jean E. Villemaud, 7, rue de la Font Pinot, 87008 Limoges Cedex, France

[21] Appl. No.: 176,296

[22] Filed: Aug. 8, 1980

[51] Int. Cl.³ .................. B60M 7/00; B65G 37/00
[52] U.S. Cl. ................................ 104/88; 198/358
[58] Field of Search ............ 104/88, 89, 91, 93, 104/96, 165, 172; 46/230, 231, 235, 240; 198/356, 358; 186/68, 69

[56] References Cited

U.S. PATENT DOCUMENTS

| | | | |
|---|---|---|---|
| 3,522,942 | 8/1970 | Hepp .................... | 198/358 |
| 3,709,351 | 1/1973 | Oldershaw et al. ...... | 198/358 |
| 3,756,374 | 9/1973 | Burt et al. ............ | 198/358 |
| 3,807,314 | 4/1974 | Slemmons ............... | 104/88 |
| 3,957,322 | 5/1976 | Mastronardi et al. ... | 104/88 |
| 3,986,597 | 10/1976 | Valentino ............. | 198/358 |
| 4,214,663 | 7/1980 | Schopp et al. ......... | 198/358 |
| 4,281,757 | 8/1981 | Mortov ................ | 198/358 |

FOREIGN PATENT DOCUMENTS

| | | |
|---|---|---|
| 2068731 | 9/1971 | France . |
| 2086957 | 12/1971 | France . |
| 2239368 | 2/1975 | France . |

*Primary Examiner*—Richard A. Bertsch
*Attorney, Agent, or Firm*—Scully, Scott, Murphy & Presser

[57] ABSTRACT

A conveyor system comprising a horizontal network of conveyors on which carriages move equipped with programming mechanisms capable of controlling the operations of loading, unloading, ascent, descent of the loads and changes of direction of the carriages. The requirements under load of a post to are detected automatically by feelers mounted on a level with the post, then transmitted instantaneously by mechanical transmission elements to a fixed element mounted on the path of the carriages which acts on the programming mechanisms of the first carriage passing by the mechanism, such that the carriage controls all operations necessary for servicing the post.

11 Claims, 31 Drawing Figures

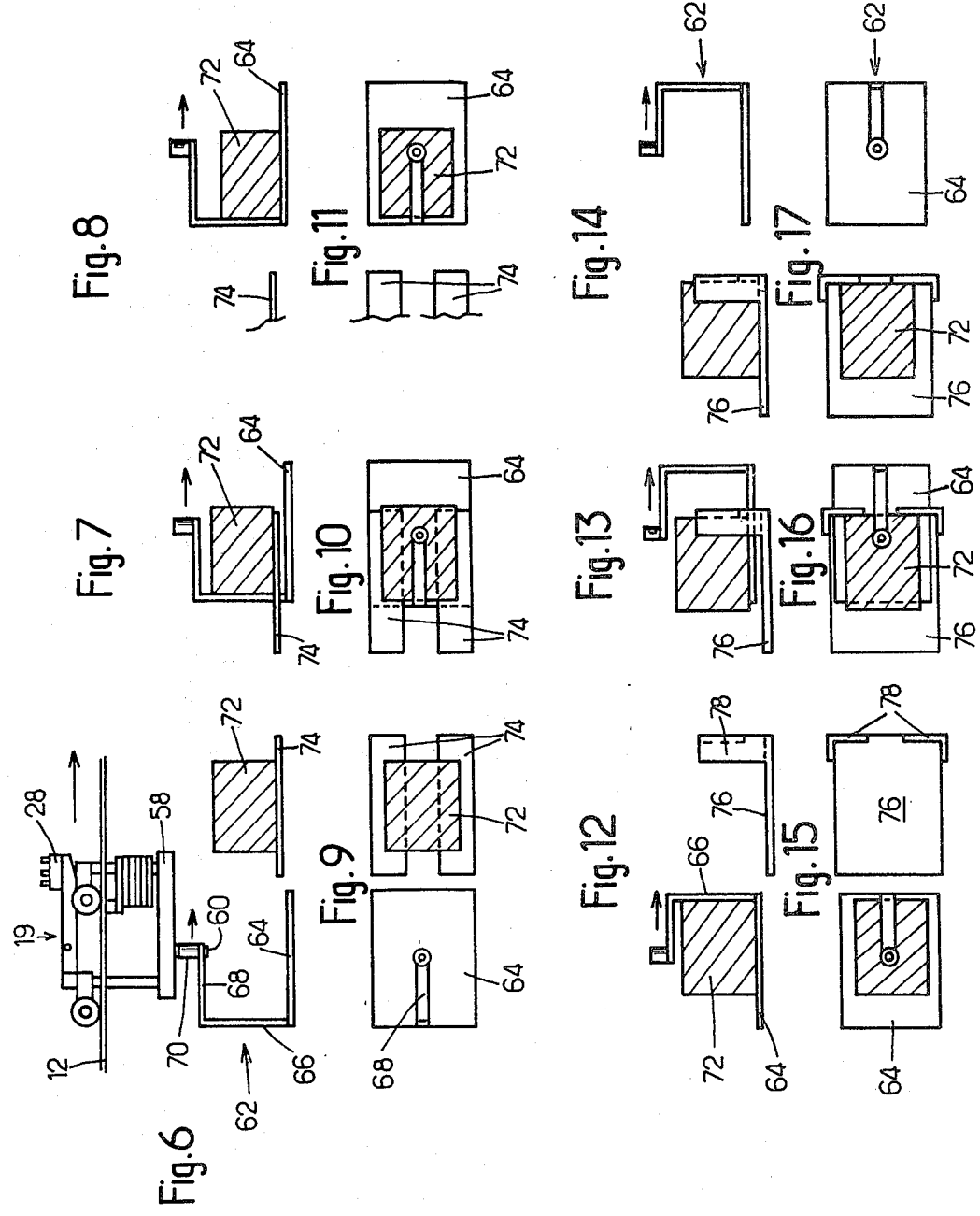

AUTOMATIC CONVEYOR SYSTEM

BACKGROUND OF THE INVENTION

1. Field of the Invention

The present invention relates to an improvement on the type of system for conveyance of loads described in French Pat. No. 2,068,731 and its Certificate of Addition No. 2,086,957, on which run carriages of the type described in French Pat. No. 2,239,368.

A conveyor system of this type is formed by rectilinear modular elements connected perpendicularly. Each element comprises a horizontal roller-track for the carriages and a guide-rail containing a drive chain cooperating with a means for pushing mounted on the carriages to drive the latter along the roller-track. The connection between the two parallel modular elements is accomplished by joining elements which contain the curved parts of the roller-track as well as the pinions and adjusters of the drive chain.

The carriage further includes a suspension portion mounted on rolling mechanisms, an engaging mechanism constituted by a mounted wheel pivoting loose on the suspension portion and capable of meshing with the drive chain, means for locking the wheel, a pilework portion formed by a vertical tube integral with the suspension portion, on which are inserted through one of the ends a pile of small horizontal, elongated plates, arranged on both sides of a vertical tubular stop, a hitching-on-portion of the load, and a guide mechanism integral with the pilework portion and capable of being intercepted by a shunt-rail mounted fixed at each junction of the conveyor network in order to deflect the carriage towards a side track. Seen in perspective, the switching portion of the carriage has perceptibly the aspect of a honeycomb. For this reason, we will henceforth designate this portion of the carriage by the term "honeycomb".

The honeycomb serves to direct the carriage on the conveyor system. For this effect, the small plates have received a predetermined position on one side or the other of the tubular stop, and during the progression of the carriage on the conveyor system, the free ends of the small plates are capable of interfering with one of the several fixed stops. The honeycomb unit is then pivoted around the vertical tube bearing the small plates, so that the guide mechanism is intercepted by the shunt-rail and the carriage is deflected on a side track of the conveyor network.

2. Discussion of the Prior Art

In the conveyor system known in the prior art, the small plates constitute a memory of data, such as the path to follow on the conveyor network, or the destinations of loading and unloading. With an arrangement given by the small plates and the corresponding fixed stops, the carriage will accomplish automatically, at very precise moments, a succession of operations chosen in advance.

A change of the mission of the carriage during its movement is excluded with such a conveyor system. Before, you would have to stop the carriage, then manually modify the arrangement of small plates and the fixed stops, which introduces a notable delay in the handling of loads and risks leading to false manuverings on the part of the user.

Moreover, in known conveyor systems, the change of level of the loads is carried out by means of inclined conveyor elements along which the carriages bearing the loads travel up or down. It is realized that such a system is difficult to install and also is relatively cumbersome.

In addition, the load is suspended by a hook and is removed manually, which excludes automation in the loading and unloading and limits the utilization of the conveyor system to a basic load.

SUMMARY OF THE INVENTION

The present invention has as an object an alleviation of the drawbacks of the prior art, proposing first an entirely horizontal conveyor system in which changes of level are accomplished through vertical movement of the loads while the carriages continue to move horizontally, and secondly an improved handling of loads on the conveyor system.

To improve handling, the present invention modifies automatically in time, and without human intervention, all or part of the program of the development of operations to adapt the program to new conditions which become established in the conveyor system. In the case of a conveyor system in a department store which automatically supplies the different departments with merchandise, the improvement means for example that the provisioning is not accomplished at fixed times, but when the supplies in the departments begin to be depleted. In the case of a factory, improved handling ensures that the workers at different work posts never have to worry about either their being supplied, or about the removal of finished products, whatever their rhythms of work may be. In other words, the improvement is an automation in the development of operations which are time variable.

The present invention has, therefore, an object of an improved and automatic conveyor system applied to a horizontal network of conveyors on which carriages move equipped with programming mechanisms for controlling the operations of loading, unloading, ascent, descent of loads and changes of direction of the carriages. The conveyor system is characterized in that the needs under load of a post to be serviced are automatically detected by mechanical detection devices, such as feelers, mounted on a level with the post, then transmitted instantaneously by mechanical transmission elements to a mechanism mounted fixed on the path of the carriages which acts on the programming mechanisms of the first carriage travelling by the mechanism, such that the carriage controls all of the operations necessary for servicing the post within a prescribed time.

Thus, data constants, such as the destinations of the points of loading and unloading, of ascent or descent of loads, are memorized at the departure of the carriages. At the reception of the data variables in time that constitute the requirements of the post, a carriage executes the operations of loading, unloading, descent or ascent which are prescribed to satisfy the requirements of the post.

BRIEF DESCRIPTION OF THE DRAWINGS

The foregoing and other objects, advantages and characterizing features of the inventive automatic conveyor system will become more readily apparent from the following detailed description of a preferred embodiment thereof, taken in conjunction with the accompanying drawings wherein like reference numerals denote similar parts throughout the various views and in which:

FIGS. 6 to 8 show in elevation three successive phases of a loading operation by a carriage provided with a car;

FIGS. 9 to 11 are plan-views corresponding to FIGS. 6 to 8, the car being only represented for the clarity of the drawing;

FIGS. 12 to 14 show in elevation three successive phases of an unloading operation.

FIGS. 15 to 17 are plan-views corresponding to FIGS. 12 to 14;

DESCRIPTION OF THE PREFERRED EMBODIMENTS

The conveyor system and the carriage according to the present invention are based on principles already explained in the above-mentioned patents, and accordingly only the new embodiments thereof will be described in detail herein.

Figure 1:
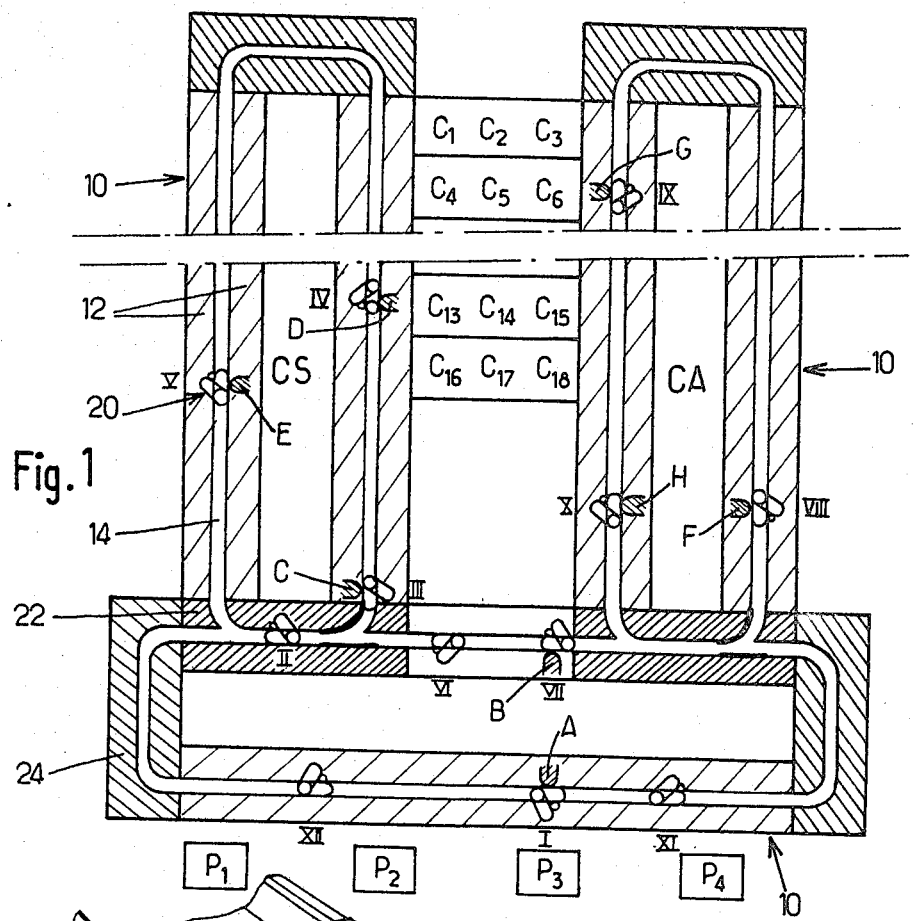
FIG. 1 is a schematic plan view of the conveyor system according to the invention, adapted in the case of a power assembly shop.

The conveyor network represented in FIG. 1 is composed of rectilinear modular elements 10 being connected at right angle. Each modular element comprises a horizontal roller-track 12 (FIG. 2) formed by two areas separated by a small gap 14 and a guide-rail 16 in which moves a drive chain 18 fitted out with pushers 20. The connection between the two parallel or perpendicular modular elements is made by means of joining modular elements 22, 24 comprising the curved part of the roller-track, the pinions and the adjusters, not shown, of the chain 18.

Figure 2:
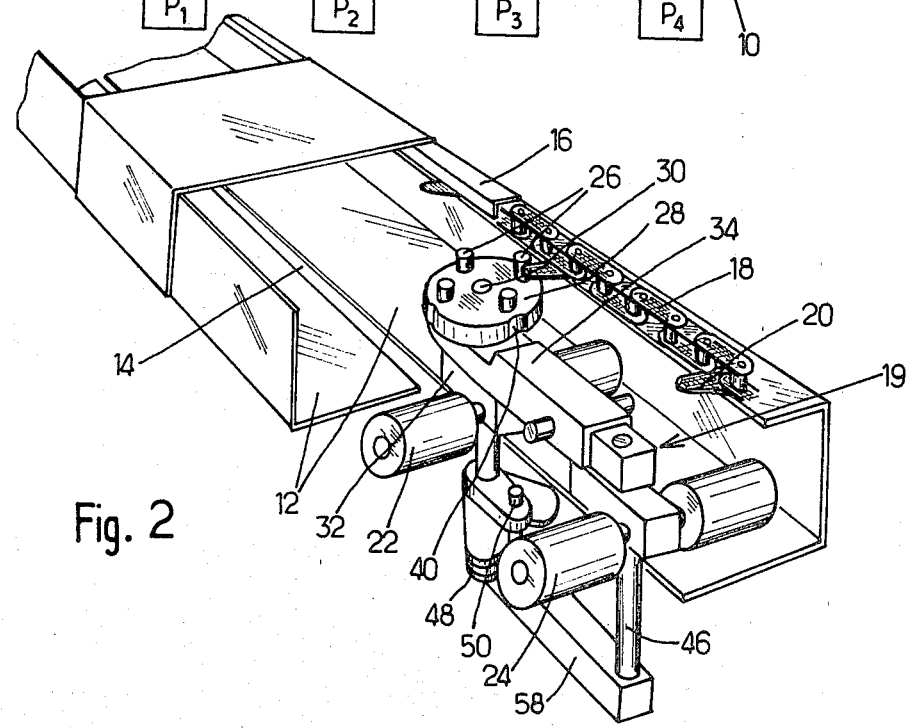
FIG. 2 is a view in axonometric projection of a carriage according to the invention, in position on its running-rail.
Figure 3:
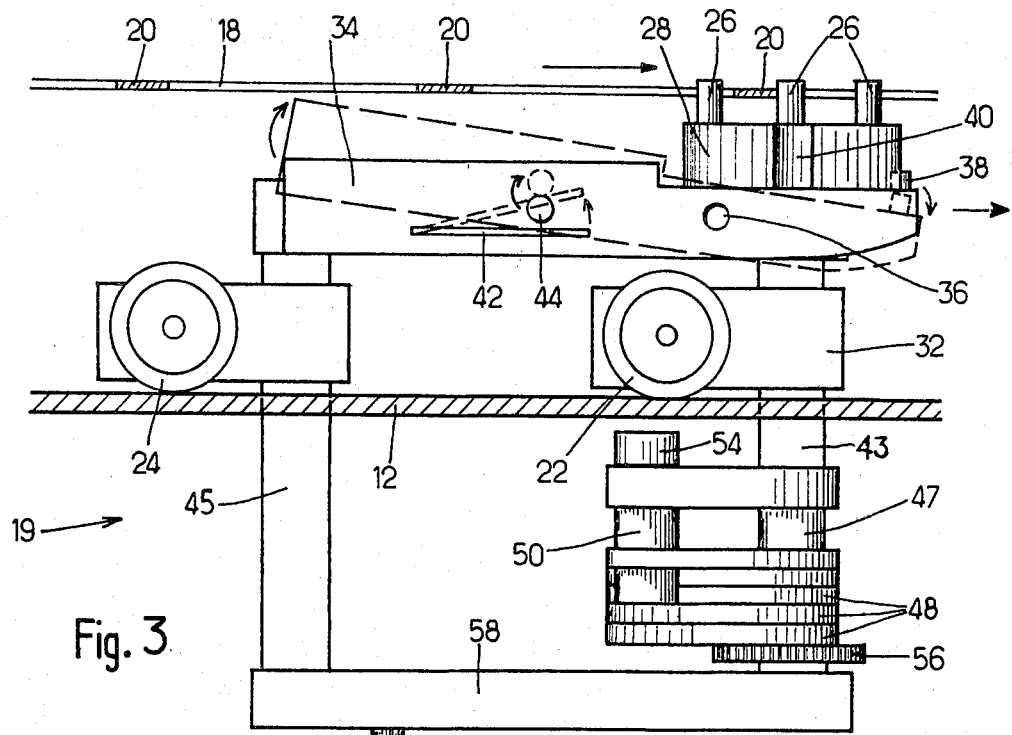
FIG. 3 is a view in elevation of the carriage in FIG. 2.
Figure 4:
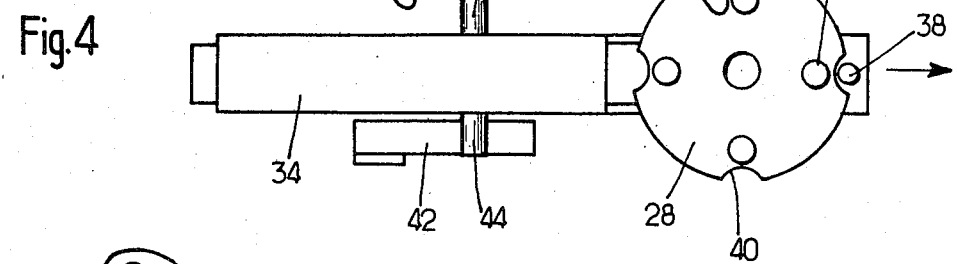
FIG. 4 is a plan-view of FIG. 3, the rolling mechanisms and the small plates being omitted for the clarity of the drawing.

On this network move load-carrying carriages 19, of which one is shown in detail on FIGS. 2 and 3. Each carriage includes a pair of front wheels 22 and a pair of rear wheels 24 arranged to roll on the two areas of the roller-track 12. For the driving of the carriage, the pushers 20 of the chain 18 work together with one of the four projections 26 which surmount a disc 28 mounted pivoting around a vertical axis 30 integral with the front structure of the carriage, between a horizontal position of rest (in heavy lines on FIG. 3) and an inclined position (in broken lines). The shoe 34 is furnished with a stop 38 capable of tailing in one of the several notches 40 (FIG. 4) formed on the periphery of the disk 28, preventing, thus, the latter from turning around its axis. The disk is then integral with the carriage which is pushed on the roller-track.

In its inclined position, the shoe 34 pivots around its horizontal axis 36. The stop 38 is no longer tailed in the notch 40 and the horizontal disk 28 turns loose around its axis. The tits 26 are one after the other pushed by the pushing elements 20 of the chain. The carriage no longer being driven, it stops.

The pivoting of the shoe 34 around its axis can be obtained either in lowering its front part, or in raising its rear part. One can, for example, cause the stopping of the carriage in arranging on its passage a pivoting plate 42 (FIGS. 3 and 4) on which can roll one of two lateral traveling wheels 44 or 46, which will have for effect to make the shoe tip up towards the front. When the plate 42 retakes its horizontal position, the rear of the shoe falls down again through gravity and the carriage starts out again.

Under the carriage are fixed, front and back, two vertical axes 44 and 46 passing through the gap 14 formed between the two areas 12. On the front axis 44 is inserted a tube 47 around which are stacked elongated little plates $48_1$ to $48_5$, the rear of the little plates coming to abut against a rod 50 tailed just like the tube 47 in an oblong piece 52; the upper part of the rod 50 is furnished with a roller 54.

Figure 5:
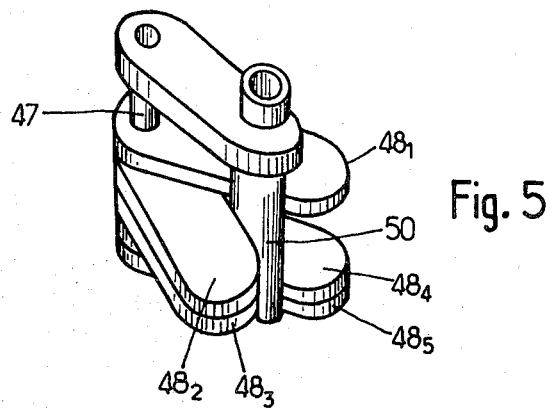
FIG. 5 is a view in perspective of the "honeycomb" part of the carriage.
Figure 21:
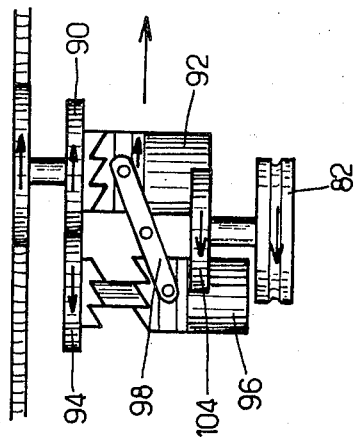
FIG. 21 shows the said mechanism in an engaged position so as to cause the climb of the load.
Figure 20:
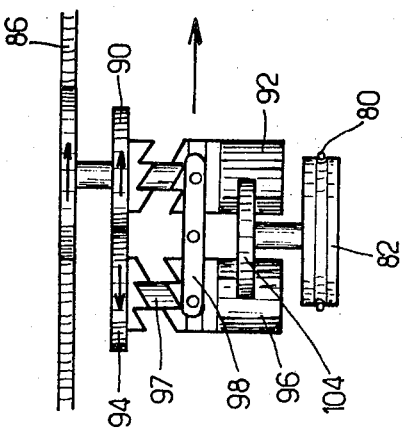
FIG. 20 shows the said mechanism on the deadpoint.
Figure 18:
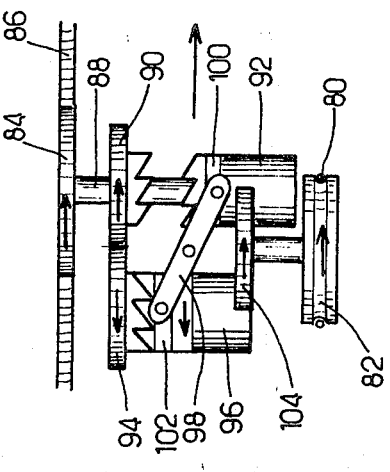
FIGS. 18 and 19 are schematic views in elevation and in plan of an engaging mechanism destined to cause the descent of the load.
Figure 19:
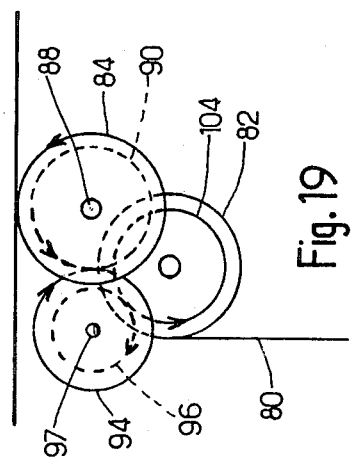

The small plates 48 can be arranged at will to the right or to the left of the rod 50, each combination corresponding to a set of data constants and variables, consequently to a well defined program for the carriage. The carriage portion comprising the tube 47, the small plates 48 and the tube 50 will be called henceforth "honeycomb" by reason of its particular form (see FIG. 5).

At the lower end of the tube 47, one can fix a pinion 56 used for the changes of program, as will be described later. Beneath the honeycomb, the two vertical axes of the carriage are connected by a crosspiece 58 under which can be fixed an axis 60. The objects to be conveyed are generally suspended from the carriage, either directly, for example, by a hook fixed on the crosspiece 58, or by a car. In this second case, the car can either be fixed directly to the crosspiece 58, or attached to the cable of a hoisting-crab, itself fixed to the crosspiece 58, the said hoisting-crab effecting the selective movement of the car in the vertical plane. Such a hoisting-crab can be mounted as well at a fixed post on the conveyer. A detailed description of it will be given later.

FIGS. 6 to 11 represent the automatic loading operations by a carriage furnished with a car 62. The car is composed of a horizontal plate 64, of an upright comprising a vertical portion 66 surmounted by a horizontal portion 68 and finally by a little portion of vertical tube 70 allowing the car to pivot around the axis 60 fixed under the crosspiece 58 of the carriage.

A parcel 72 is put on a platform 74 formed by two tables separated by a spacing slightly superior to the width of the vertical upright 66.

For the taking under load of the parcel, the table 64 passes under the platform 74, the upright 66 moving between the two sides of the platform. When the said upright comes into contact with the parcel 72 (FIG. 7), it pushes it in the running direction. The parcel slides on the two sides of the platform 74, then tips up progressively on the table 64 of the car 62 (FIG. 8).

In order to make the parcel 72 of the table 64 pass to a platform, one first makes the car pivot 180° around the axis 60 (FIG. 12) in such a way that the vertical upright 66 is turned towards the front, then one makes the table 64 pass slightly above a platform 76 provided with two bumping-posts 78 (FIG. 13), it is held back, slides on the table 64, then tips up progressively on the platform 66 (FIG. 14).

In order that these operations may be effected correctly, it is necessary that at the moment of transfer, the platform 74 or 76 be on the trajectory of the car. To do this, one has the choice between two solutions:
  the car 62 moves in the horizontal plane, and the platform is furnished with a lift which brings it at the desired moment on a level with the car;
  the platform is fixed and it is the housing which moves in the vertical plane in order to arrive at its level.

When it's a matter of moving the platform vertically, it is easy to drive the lift by the power unit of the conveyor. In the case where it is the car which is displaced vertically, the driving of the lift is done by the very movement of the carriage. In the two cases, one can use the lift which is represented on FIGS. 18 to 21. On these figures, it has been imagined that the lift is fixed to the crosspiece of the carriage. The car, not shown, is imagined to be suspended on a cable 80 wound around a pulley 82.

The lift comprises a pinion 84 which meshes with a rack 86 fixed on the roller-track 12. On the axis 88 of the pinion 84 is mounted an engaging device comprising a fixed pinion 90 and a losse pinion 92 mounted sliding on the axis 88. The fixed pinion 90 meshes with a fixed pinion 94 of a second pinion engaging device whose loose pinion 96 is mounted sliding on the axis 97 of the pinion 94. The loose pinion and the fixed pinion of each engaging device are furnished on their opposite faces with teeth that mesh in each other when the loose pinions are brought into contact with the corresponding fixed pinions through a sliding motion along their respective axis. A control rod 98 connects two disks 100, 102 turning freely in relation to the loose pinions of the connecting gear but interdependent of these last in axial movement. The two loose pinions 92, 96 of the two gears engage with an outlet pinion 104 on the axis of which is fixed the pulley 82 above mentioned.

When the carriage starts out, the pinion 84 which meshes with the rack 86, fixed to the roller-track, turns in the opposite running direction so it is with the pinion 90 mounted on the same shaft while the pinion 94 which meshes with the pinion 90 turns in the running direction of the carriage.

When the control rod 98 is in its median position (FIG. 20), that is when it is parallel to the roller-track and to the rack 86, the mechanism is on the dead-point: the pinions 92 and 96 are disengaged. The pinion 104 which meshes with them is stopped, just as the pulley 82 and the car suspended on the cable 80 moves on a constant level.

When the rod 98 pivots in a direction such as the pinion 96 meshes with the pinion 94 (FIG. 18), the said pinions 94 and 96 turn in the running direction, the pinion 104 and the pulley 82 turn in the opposite direction, the cable 80 unwinds and the car descends.

Finally, when the rod 98 pivots in a direction such as it is the pinion 92 which meshes with the pinion 90, the pinion 104 and the pulley 82 turn in the direction of the running, the cable 80 winds up and the load climbs.

Before describing the means worked out to obtain the improvement of the conveyor system, we will explain now the meaning of this term concerning the example shown in FIG. 1 which represents a factory. The shop comprises four work posts $P_1$, $P_2$, $P_3$, $P_4$ and a storehouse of stockage provided with inclined bins $C_1$, $C_2$, $C_3$, etc. . . . arranged on three levels, the handling between the shop and the storehouse being ensured by the schematized conveyor already described on which, for the clarity of the drawing, the carriages are represented by honeycombs.

In order that the workers affected at the different work posts not have to worry about their being supplied or about the removal of the products worked, the following conditions must be realized:
  when a job is finished at a post, for example at $P_3$, a carriage must automatically take under load the product at the place and at the level where he is (Position 1), convey it through the network of conveyors (positions II and III) and set it down at the place and at the level where it must be stocked in the storehouse (position IV, bin $C_{15}$),
  when the advancing in products to be manufactured by a work post (poste $P_3$) reaches the level of alarm, a carriage must automatically go into the stocking storehouse (positions VII and VIII) to take under load the desired product at the place and at the level when it is stocked (position IX, bin $C_5$), convey it through the network of conveyors (positions X and XI) and put it down within the prescribed time at the place and at the level where it must be machined (position 1, post $P_3$).

The execution of these different operations can be broken down into three parts:
  memorization on the carriages of the data constants such as the destinations of the points of loading and unloading,
  automatic and permanent measurement of the data variables in time (exact moment when a piece must be removed, exact moment when a post must be supplied, fluidity of the traffic of the carriages at a given moment to a given place . . . etc.) and instantaneous transmission of these data variables to the carriages which convey them by degrees to the mechanisms of execution,
  receiving and synthesis of the different data by mechanisms which will carry out the instructions (ascent, descent, loading, unloading . . . etc.) at the moment, at the level and at the place desired.

It has already been explained that the orientation of the different little plates of the honeycomb corresponds to a certain number of data constants or variables in time.

Figure 22:
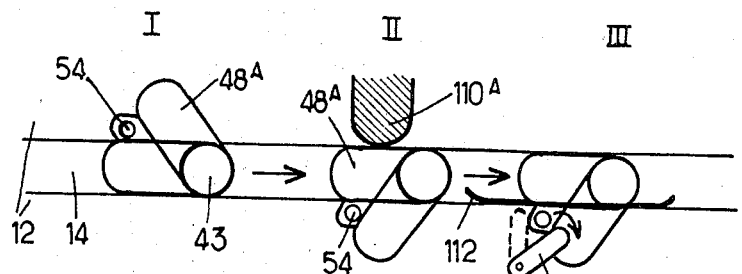
FIG. 22 is a schematic plan-view showing a honeycomb in three successive positions during its engagement with a control-lever.
Figure 23:
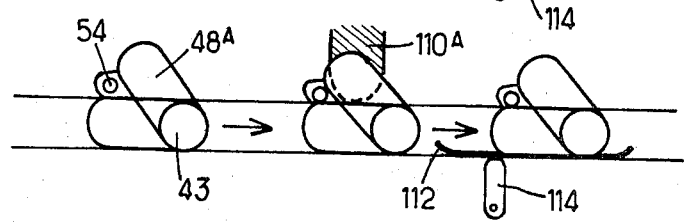
FIG. 23 is a view similar to FIG. 22, in the case of a honeycomb which does not work together with the control lever.
Figure 24:
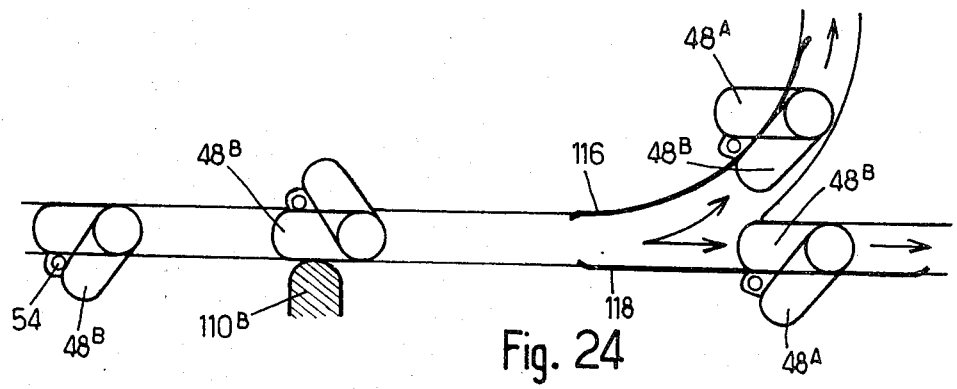
FIG. 24 is a schematic plan-view showing a honeycomb in successive positions during the negotiation of a turn.

The FIGS. 22 to 24, where the carriages are represented by their honeycombs, show the process of retransmission of a datum by the honeycomb. In order to facilitate the understanding of these figures, the honeycombs have been represented only with two small plates, 9A and 9B, the results staying valid whatever the number of the small plates may be.

On FIG. 22, when the honeycombs meet on their way a stop 110A situated in a same horizontal plane A as the small plate 48A (position II), the latter is pushed back by the stop 110A. The honeycomb pivots then around its axis 44 and its roller 54 passes on the right side of the roller-track 12, inserts itself behind a guide-rail 112 (position III) and can thus push selectively a lever 114 situated on this same side. The honeycomb of FIG. 23, on the other hand, is not touched by the stop 110A. Its roller 54 stays on the left side and has therefore no action on the lever 114.

It results that no matter what mechanism whose starting is caused by the rotation of the lever 114, it is controlled selectively by just the honeycombs programmed for that. For example, if the lever 114 is in direct engagement with the rod 98 of a lift of the type in FIG. 18, it will be able to control selectively the ascent and the descent of a car or of a goods-lift.

Inversely, no matter what fixed mechanism can, through the intermediary of stops 110, transmit selectively a piece of information or an instruction to a movable receiving mechanism; for example, as on FIG. 24, any transmitting mechanism whatever in putting in place a stop 110B orients towards the left the honeycombs having their small plate 48B towards the right, their roller 54 coming to insert itself behind a rail 116, the others continuing straight ahead, their roller 54 inserted behind the nail 118.

Figure 25:
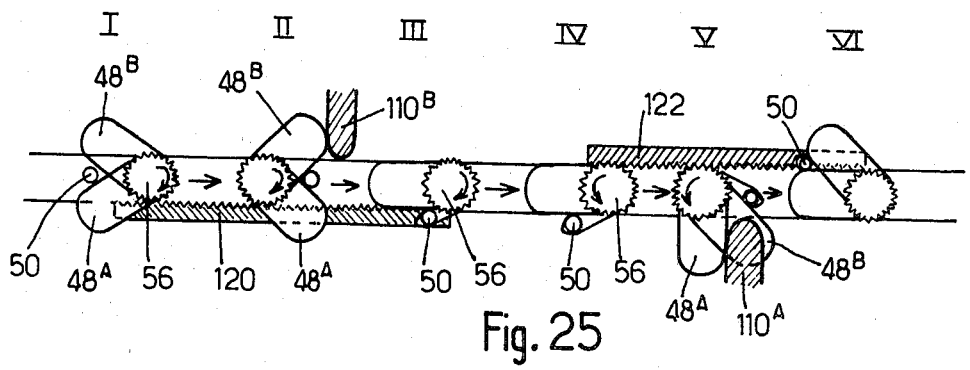
FIG. 25 is a schematic plan-view of a device destined to change the program of a honeycomb.

FIG. 25 shows the change of program of a honeycomb. The pinion 56 of the honeycomb (see FIG. 3 as well) meshes with a rack 120 (position 1) making thus pivot the unit of the honeycomb. When the rotation reaches 180° (position 11), a stop 110B comes to push back the small late 48B, while the rotation of the small plate 48A continues until the small plates are superimposed (position 111), the preceding program being therefore completely effaced. The pinion 56 meshes then with a second rack 122 (position IV) placed on the other side of the roller track, so that the honeycomb pivots in the opposite direction. A selective stop 110A being on the passage of the small plate 48A (position V) retains this last one while the small plate 48B continues to pivot, the rotation stopping when the small plates have taken their new place on both sides of the rod 50 (position VI).

In the examples of FIGS. 24 and 25, there is selective transmission of a fixed transmitting mechanism to a movable receiving mechanism. Likewise, one sees in the example of FIG. 22 that a fixed transmitting mechanism can, through the intermediary of a stop 110 and a honeycomb, transmit selectively a piece of information or an instruction to a receiving mechanism, itself fixed also, controlled by a lever 114: there is thus transmission of a datum selective from one fixed post to another fixed post.

Finally, if one replaces the lever 114 by a pile of pivoting small plates, a honeycomb will be able, in pushing some of these small plates, to leave a message which will be received by another honeycomb: these will be then transmission of a datum selective of one moving body to another moving body.

In short, it is seen that through the intermediary of honeycombs, one can transmit data selectives whether the transmitting mechanism be fixed and the receiving mechanism movable or rather the inverse or again that the two be fixed or finally that the two be movable.

With reference to the FIGS. 26 to 31, the transmission to the honeycombs of the data variables in time will be studied. One will distinguish the data selectives which are meant for carriages having a determined program and the data non-selectives which apply to all the carriages which pass at a determined place at a given moment.

Figure 26:
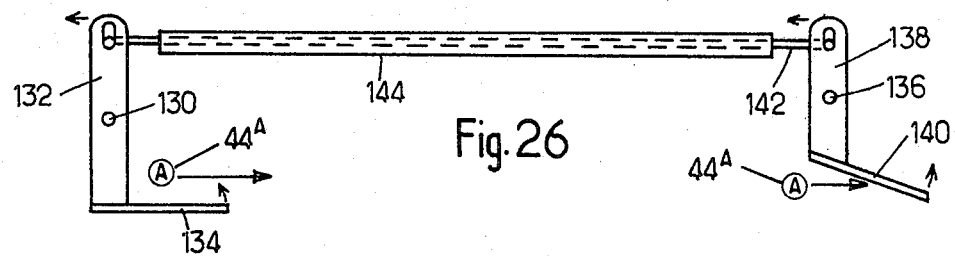
FIGS. 26 and 27 represent in two different positions a transmission mechanism of a stop order.

FIG. 26 represents an example of transmission of a datum variable in time but not selective. A first carriage A, represented by its single roller 44A in order to lighten the drawing, gives to a carriage B represented by its roller 44B the information of its passing through at a given point of the circuit at a given instant, as well as the instruction to stop instantaneously at another given point of the circuit. It will be noted that the data not being selective (they are meant for any carriage being at a given instant at a given place), the honeycombs, whose role is always selective, are not made to intervene. The mechanism of transmission is fixed on the frame of the conveyor along and slightly above the roller-track. It is composed of a unit being able to pivot around an axis 130, unit made up by a vertical plate 132 and an orthogonal plate 134, of a second unit being able to pivot around an axis 136 and made up by a vertical plate 138 and an orthogonal plate 140 and finally by a rod 142 connecting the pieces 132 and 136 and capable of sliding in a tube 144.

Figure 27:
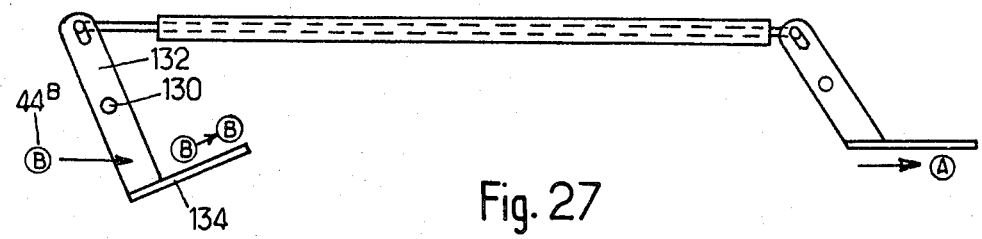
Figure 29:
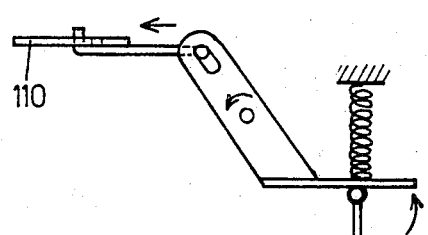
FIGS. 28 and 29 are views in elevation of a contrivance transmitting the information of the removal of a load.
Figure 28:
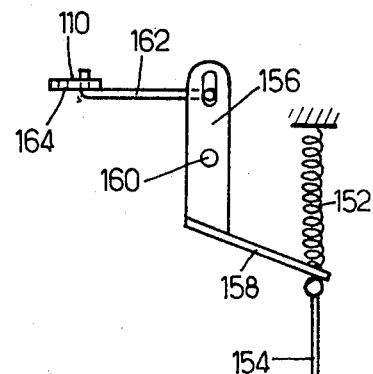
Figure 31:
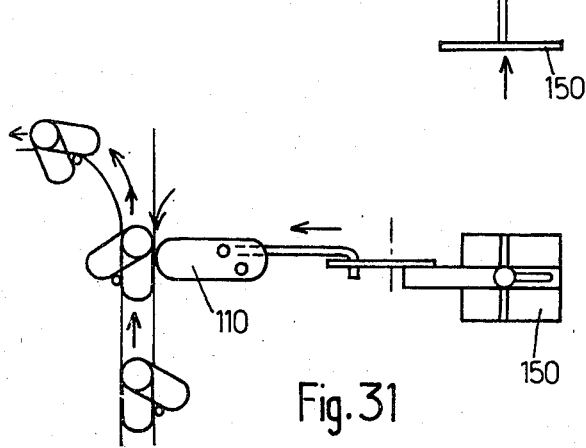
FIGS. 30 and 31 are plan-views of FIGS. 28 and 29 respectively.
Figure 30:
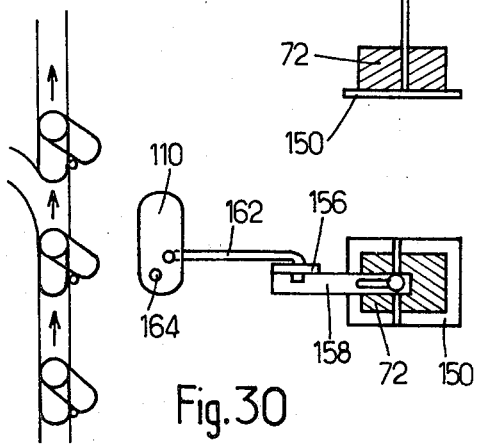

When the carriage A passes in front of the unit 132, 134, its roller 44A is not touched by the plate 134. On the other hand, when it comes on a level with the unit 138, 140, its roller 44A lifts the plate 140, which has for effect to make the unit 138 pivot, 140 around its axis 136. The rod 142 slides towards the left, which has for effect to make the unit 132 pivot, 134 around its axis 130, the right end of the plate pivoting towards the top (FIG. 27). If a carriage comes at this moment on a level with the unit 132, 134, its roller 44B will roll on the table 134 until the carriage B disengages and stops. In this case, the datum variable constituted by the announcement of the passage of the carriage A is picked up by the feeler 138, 140, which transmits it to the carriage B through the intermediary of the pivoting stop 132, 134.

It is sufficient to place this mechanism at different points of the circuit to regulate automatically all the traffic problems of the carriages: in particular, each converging intersection includes a certain number of these mechanisms in order to block the movement of the carriages on one of the tracks while the other carriages move freely on the other track.

The variable selective data are meant for the honeycomb. They are collected by instruments such as a feeler, balance or meter which transmits them selectively to the honeycomb through the intermediary of stops by the method previously described.

FIGS. 28 to 31 show how the information which advances it in pieces to a work post has reached the level of alarm, can be transmitted automatically and selectively to the honeycomb of the carriage attributed to this post.

When the worker takes a parcel 72 on the platform 150 placed within reach of his hand and connected to a spring 152 by a rod 154, the said spring which was stretched by reason of the weight of the parcel, retracts instantaneously, making a unit 156 pivot, 158 similar to the units of FIG. 26 around its horizontal axis 160. A rod 162, which slides in a horizontal tube, not figured on the drawing, makes a stop 110 pivot around an offset axis 164, putting it thus into active position. When the carriage assigned to the work post passes in front of this stop, the honeycomb pivots and the carriage goes towards the stock storehouse in order to go and get a new parcel that it puts down on the platform 150. The spring 152 is again stretched by the weight of the parcel, the unit 156, 158 pivots around its axis and the rod 162 puts back the stop 110 in neutral position. In this case, the datum variable in time constituted by the announcement of the removal of the parcel is collected by the platform 150 from the spring-balance which transmits it to the carriage ascribed to the post $P_3$ through the intermediary of the pivoting stop 110.

For the removal of the finished products, the process is the same but with this difference that the putting into place of the stop is caused by the lowering of the platform under the weight of the parcel of finished products.

All the elements allowing the improvement of the handling are brought together, and one can now explain the manner of functioning of FIG. 1.

The memorization on the carriage of all the data constants necessary for its function will be done in orienting the small plates of the honeycomb towards stops corresponding to the destinations of the post $P_3$ and bins $C_{15}$ and $C_5$. In order to go and put down a manufactured product in bin $C_{15}$, the honeycomb will have to be oriented by a stop A (position 1) towards the stocking circuit C S, then a stop C (position III) will select the level of the bin, a stop D (position IV) the point of unloading, a stop E (position V) the level of return. For the provisioning, a stop B (position VII) will orient the honeycomb towards the supply circuit C A, a stop F (position VIII) will select the level of the bin $C_5$, a stop G (position IX), the point of loading, a stop H (position X) the level of return.

The honeycomb will have to, therefore, have on the right the stops A, B, D, G and the corresponding small plates, and on the left, the stops C, E, F, H and the corresponding small plates.

The automatic and permanent measurement of the data variables in time will be done, for the non-selective data (such as the traffic or the carriages) by the device in FIGS. 26 and 27 and for the data selectives, by the device in FIGS. 28 to 31. These data will be, on the one hand, the order of removal of the machine-finished pieces which will cause the positioning of the pivoting stop A, the said stop directing the honeycomb towards the storage circuit according to the principle in FIG. 24, and on the other hand, the reprovisioning order which will cause the positioning of the pivoting stop B, the said stop directing the honeycomb towards the supply circuit C A according to the principle in FIG. 24.

For the receiving and the synthesis of the different data, the working mechanisms will be the following:

- at the point 1, will be arranged a platform 74 with a lift conforming to the FIGS. 6 to 17 and 18 to 21 with release by level in accordance with the principle in FIGS. 22 and 23;
- at the points III, V, VIII and X will be provided racks designed to mesh with the lift of the carriage as in the case of the FIGS. 18 to 21, and a release by lever as in the case of the FIG. 6.
- at the points IV and IX are provided platforms 74 with release by lever as in the case of the FIGS. 22 and 23.

In order to solve the handling problem in FIG. 1, a certain number of choices have been made a priori: carriage-honeycomb assigned to each post, movable lift fixed under the carriage, housing with a fixed horizontal table . . . etc.

For this problem as for most of the other problems which can be set in improved handling matters, other options can be taken without leaving, in so doing, the scope of the invention.

One can, for example, utilize carriages whose honeycomb does not store any datum constant; any need at a point and at a given moment is automatically transmitted in accordance with the principle according to the FIG. 28 to 31 to a series of stops which, by the process according to FIG. 25, entered on the honeycomb of the first carriage presenting itself, all the destinations or references necessary for the accomplishment of its mission.

One can also utilize as lifts, for loading and unloading, permanently located chain and bucket conveyors controlled by a lever pushed selectively by the honeycomb.

One can finally utilize different types of cars according to the nature of the loads; thus in the case of pelletized loads, the floor of the car can be replaced by a horizontal fork capable of tailing into the palette, whereas for pulverulent or even liquid materials, the floor will be replaced by a bucket whose tilting will be controlled by the honeycomb, etc.

In conclusion, the conveyor system of the invention brings a special solution to most of the problems of improved handling.

What is claimed is:

1. An improved, automatic conveyor system applied to a horizontal network of conveyors on which carriages move which are equipped with programming mechanisms for controlling the operations of loading, unloading, ascent, and descent of the loads and changes in direction of the carriages, comprising a mechanical conveyor and a post, the functions of said post under load are detected automatically by mechanical detecting mechanisms mounted on a level with said post, then transmitted instantaneously by mechanical transmission elements to a stationary unit mounted on the path of the carriages which is capable of acting on the programming mechanisms of the first carriage passing by said device, so that said carriage controls all said operations necessary for servicing at said post, the carriage is provided with a car which receives a load from a loading platform such that the car moves in a horizontal plane and the loading platform (74) or unloading (76) is brought to the level of the car by a stationary mounted lift drawn by the power unit of the conveyor, said lift comprises a pinion (84) meshing with a rack (86) carried by the conveyor which drives in different directions two engaging devices (94, 96; 90, 92) mounted in parallel, the outlet pinions (96, 92) of which drive in rotation, in one direction or the other, a rope (80) wheel (82) from which is suspended the car (62) depending upon whether one or the other of said outlet pinions is engaged, the car then moving towards the top or bottom, or else moving at the same horizontal level when both outlet pinions are disengaged.

2. Conveyor system according to claim 1, in which the car comprises a horizontal plate, on an edge of which is fixed a vertical upright, characterized in that said upright (66) is pivoted around a vertical axis (60) on the structure of the carriage (19) to turn the car freely around said axis.

3. Conveyor system according to claim 1, characterized in that the load (72) to be passed on the car (62) is placed on the loading platform having two plates (74) separated by a slight spacing greater than the width of the vertical upright (66), so that during movement of the carriage (19), said upright, passing between said plates, pushes the load on the platform to transfer it onto the floor (64) of the car.

4. Conveyor system according to claim 1, characterized in that during unloading of the car (62), an unloading platform is used (76) having vertical buffers (78) to retain the load (72) during movement of the carriage until transferring it from the floor (64) of the car to the unloading platform.

5. Conveyor system according to claim 1, characterized in that the outlet pinions (96, 92) of the connecting gears are connected to a pivoting connecting rod (98) between a position in which the upfeed coupling (90, 92) is engaged, a position in which the down feed coupling (94, 96) is engaged, and a neutral position in which the two couplings are disengaged, said connecting rod being positioned in one of its positions by control levers, which are in turn positioned by small honeycomb plates (18 to 21).

6. Conveyor system according to claim 1, in which fixed stops (A to H) are arranged on the path of the carriages, each carriage (19) having a pile of small plates or honeycombs (48) mounted pivotally around a vertical axis (47) of said carriage, said stops cooperating with said honeycombs and positioning them selectively, characterized in that said honeycombs, selectively positioned, cause a control lever (114) to pivot towards an active position in which the lever activates a mechanism effecting a constant operation such as loading, unloading, ascent or descent.

7. Conveyor system according to claim 6, characterized in that the honeycomb is provided with a pushing element (54) for actuating said lever (114) from its inactive position towards its active position.

8. Conveyor system according to claim 7, characterized in that the traffic of the carriages on the conveyor is automatically regulated by utilizing a transmission mechanism of assigned variables or a feeler comprising, on the one hand, a first and a second part (132, 138) mounted pivotally respectively about two horizontal and parallel axes (130, 136) the first down the line from the second in relation to the direction of travel of the carriages on the conveyor, and on the other hand, a mechanical transmission element (142) linked to the said parts, the arrangement being such that, when the first part (132) interferes with the path of a coupling mechanism (44) carried by the carriage, the second part (138) does not interfere with the said path, and that a pivoting of the first part, caused by the passage of a carriage, is transmitted up the line by said transmission element (142) to the second part, which then interferes with the coupling mechanism of the following carriages.

9. Conveyor system according to claim 8, characterized in that said transmission mechanism is arranged at the intersections of the conveyor to block the traffic on one of the tracks while the other carriages move freely on the other track, said parts making the coupling mechanism of the carriage pivot to disengage the batter from the driving means and cause it to stop.

10. Conveyor system according to claim 9, characterized in that a signal that the advance to a work post has reached the warning point is transmitted by a balance feeler at said post, comprising a retractable stop (110) mounted pivotally between an active position in which it interferes with a carriage small plate and an inactive position in which it is withdrawn, a horizontal goods-lift table (150) elastically suspended from a fixed point of said work post, such that its level varies in dependence upon whether it is or is not carrying a load, and a transmission element (156) connecting said table (150) to said stop (110), such that the high and low positions of the table correspond respectively to the active and inactive positions of the stop or inversely.

11. Conveyor system according to claim 6, characterized in that the program of the honeycombs is changed by a first rack (120), with which a pinion (56) meshes carried by the tube (47) on which the small plates (48A, 48B) are inserted at least a fixed stop (110B) superimposed on the small plates, a second rack (122) arranged on the other side of said tube in relation to the first rack, and at least a second fixed stop (110A) put in place in the new position chosen the small plates on both sides of a second tube (50) parallel to the first tube and integral with the latter in rotation.

* * * * *